United States Patent Office 2,746,990
Patented May 22, 1956

2,746,990
PREPARATION OF TEREPHTHALIC ACID

Jan Pieter Fortuin and Gottfried Ernst Ramscheidt, Amsterdam, Netherlands, assignors to Shell Development Company, Emeryville, Calif., a corporation of Delaware No Drawing. Application February 1, 1954,
Serial No. 467,584

Claims priority, application Netherlands February 2, 1953

8 Claims. (Cl. 260—524)

This invention relates to a process for the production of terephthalic acid from p-diisopropylbenzene.

In recent years the production of terephthalic acid has acquired considerable importance. For example, esters of terephthalic acid and appropriate alcohols, especially glycols, possess properties which render them valuable, as in the production of synthetic fibers. Thus, there has been much interest in the development of a process for the efficient, low-cost production of this acid or its alkyl esters from cheap, readily available raw materials. The starting materials heretofore employed for the production of terephthalic acid generally are p-xylene and p-toluic acid. It is well known that terephthalic acid can be produced by the oxidation of p-xylene or p-toluic acid with such non-gaseous oxidizing agents as nitric acid, permanganates, persulfates, mixtures of sulfuric acid and chromic acid, and mixtures of sulfuric acid and manganese dioxide.

While the processes starting with p-xylene or p-toluic acid and employing these non-gaseous oxidizing agents have been in some degree successful, they are all subject to serious drawbacks. Where nitric acid is employed as the oxidizing agent, corrosion presents a very serious problem. Further, a substantial proportion of the acid employed is converted to lower oxides of nitrogen which cannot be reconverted to nitric acid. Also, it has been found virtually impossible to produce the desired product without producing as by-products various nitrated hydrocarbons or acids. These by-products represent a highly undesirable net loss in product and a further waste of the available nitric acid.

The other compounds or mixtures of compounds proposed as oxidizing agents are subject to severe criticism as well. Sulfuric acid-chromic acid mixtures, persulfates and permanganates are quite expensive to use for this purpose, for they cannot be readily and economically recovered, and processes employing them, accordingly, are not feasible on a commercial scale. The use of manganese dioxide-sulfuric acid mixtures is precluded because of the difficulty with which the reaction is controlled and because of the tarry products formed when the reaction is uncontrolled.

It has also been proposed to prepare terephthalic acid from p-xylene or p-toluic acid utilizing molecular oxygen as oxidizing agent. While these processes have been effective to some extent in producing the acid, they in turn have involved additional problems to which there have been found no satisfactory solution. It has been found that the oxidation of one methyl group of p-xylene to a carboxyl group takes place with more or less ease, but that the oxidation of the methyl group of p-toluic acid to form terephthalic acid is considerably more difficult. Thus, it has been found necessary, in practice, to resort to a two-stage process, wherein p-xylene is oxidized to p-toluic acid with molecular oxygen, and p-toluic acid is oxidized to terephthalic acid with nitric acid. No feasible commercial one-step process has been developed, and the two-stage process described leaves much to be desired, for the over-all yield is not at all satisfactory, and the cost is undesirably high.

The primary object of the present invention, therefore, is to solve these problems by presenting single-stage process whereby terephthalic acid can be prepared (1) in good yield, (2) by a process which employs a reaction mixture which is not corrosive, (3) which provides for excellent control of the oxidation, and (4) which uses readily available and inexpensive materials. Other objects of the present invention will become obvious from the following description of the invention.

It has been discovered, and this discovery forms in part the basis for the present invention, that p-diisopropyl benzene differs unexpectedly from p-xylene with respect to oxidation. Unlike p-xylene, it can be oxidized by reaction with molecular oxygen under reaction conditions which form an important aspect of the invention, to yield terephthalic acid in high yields and conversions, directly in a single step. Although the invention is not to be limited according to theory, it appears that the different manner in which p-diisopropyl benzene reacts is due primarily to the reaction mechanism whereby the alkyl substituents are oxidized and converted to carboxylic acid groups. p-Xylene appears to react according to the equations:

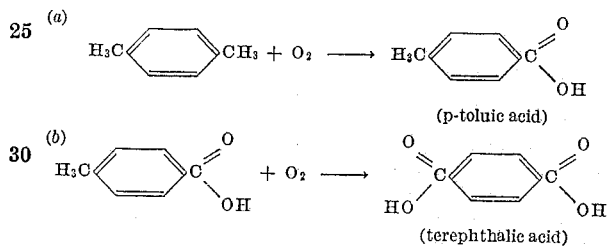

Reaction a goes forward with much greater ease than does Reaction b, the difference in the ease with which the two reactions may be conducted apparently being due to the influence of the carboxyl $$(O\!=\!C\!-\!OH)$$

the group upon the para-substituted methyl group. p-Diisopropyl benzene, on the other hand, apparently mainly reacts according to the equations:

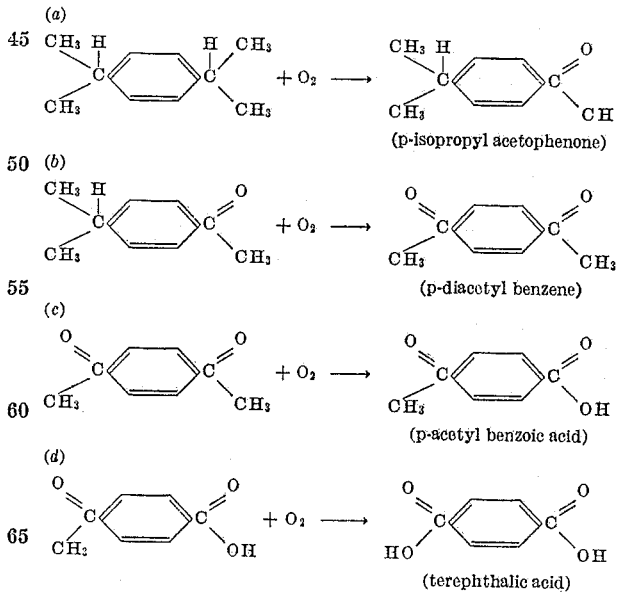

According to this reaction mechanism, oxidation of the ketone groups to carboxyl groups does not substantially occur until both of the alkyl (isopropyl) groups have been converted into ketone groups, whilst the oxidation-inhibiting effect of the carboxyl group upon the oxidation of an alkyl group is effectively nullified. Accordingly the process of the invention results in a smooth, efficient production of terephthalic acid.

It has been discovered, and this discovery forms a basis for the process of the present invention, that when p-diisopropyl benzene and a particular oxidation catalyst are added to a mixture comprising p-diisopropyl benzene, an organic solvent therefor and an oxidation catalyst, said mixture being continuously contacted with an oxygen-containing gas and the relative amounts of p-diisopropyl benzene, solvent and catalyst originally present in this mixture lying within certain stated limits, the rate of addition of p-diisopropyl benzene being such that the ratio of the concentration of p-diisopropyl benzene to solvent is maintained within these same limits and the rate of catalyst addition being such that a substantially constant level of p-diisopropyl benzene oxidation is maintained, the p-diisopropyl benzene is selectively oxidized in high yields and conversions directly to terephthalic acid. The process of the invention thus is effective for the direct conversion of p-diisopropyl benzene to terephthalic acid under conditions of temperature and pressure at which p-toluic acid appears to be inert to oxidation with molecular oxygen even in the presence of a suitable catalyst or, if it oxidizes under these conditions, forms terephthalic acid in undesirably low yields and conversions. At these same conditions, p-xylene is converted to p-toluic acid as the major product, terephthalic acid being produced only in impractically low yields, if at all.

According to the novel process, terephthalic acid may be produced from p-diisopropyl benzene by:

(a) Preparing a reaction mixture comprising essentially p-diisopropyl benzene, an organic solvent therefor and an oxidation catalyst (whose precise character and content will be hereinafter defined) in proportions such that the mixture contains from about 10 parts to about 1/15 part by weight of the p-diisopropyl benzene per part by weight of solvent, and the catalyst is present in an amount containing a total weight of metal equal to from about 0.01% to about 5.0% of the weight of the p-diisopropyl benzene charged;

(b) Passing a gas containing molecular oxygen through the mixture until active oxidation of the p-diisopropyl benzene begins;

(c) Adding to the reaction mixture additional portions of p-diisopropyl benzene and catalyst at a rate necessary to maintain the conversion of p-diisopropyl benzene to terephthalic acid at a substantially constant level and (d) Recovering as product terephthalic acid.

The terephthalic acid ordinarily separates from the liquid mixture as a heavy crystalline precipitate and may be continuously removed from the reaction zone as by filtration or equivalent means, and the remaining liquid containing unreacted p-diisopropyl benzene, intermediate products and solvent returned to the reaction vessel.

The catalyst employed in the process of the invention comprises a mixture of cobalt and manganese compounds, together with from none to a minor amount of a barium compound. By the term "compound" is meant both the inorganic and organic compounds of these metals, including their oxides, the salts of these metals and strong mineral acids, such as the chlorides, nitrates or sulfates, and the salts of such metals and organic acids, such as the acetates, salicylates, butyrates, octoates, toluates, propionates, and chelate complexes of these metals with diketones, such as cobalt isovaleryl-acetonate, cobalt acetoacetonate, and the like.

A single compound of each metal may be used as the catalyst, or a mixed catalyst may be employed.

In the mixtures of oxides or salts of manganese, cobalt and/or barium which may be employed as catalyst, the ratio of the weight of manganese to the total weight of cobalt and barium, considering for this purpose only the weight of the metal and not of the anionic radical of the salt, should lie within the range of from about 1:10 to about 100:1, and preferably within the range of from about 1:2 to about 10:1. In these catalysts, the ratio of cobalt to barium is not critical. It is also preferred that the metal salts be the salts of the same acid. Specific illustrative compounds which may be employed in the catalyst include the acetates of cobalt, manganese and barium, p-toluates or naphthenates of these metals, cobalt acetoacetonate and the like, or mixtures of these and similar salts.

It is preferred to employ but small amounts of the catalyst. A generally suitable concentration of catalyst is that which introduces into the original reaction mixture a total weight of metal (disregarding the anionic component of the salts) equal to from about 0.01 to about 5.0% of the weight of p-diisopropyl benzene charged; preferably, the amount of catalyst employed is such that the total weight of metal in the original reaction mixture is equal to from about 0.10% to about 1.5% of the weight of p-diisopropyl benzene charged.

While the desired oxidation may be carried out at atmospheric pressure, it is preferred that moderately elevated pressures be employed, since the use of these higher pressures allows the application of the cheaper low boiling solvents, such as acetic acid, and moreover substantially increases the conversion rate and thus reduces the necessary reaction time in many cases by as much as 75%. By "moderately elevated pressures" is meant that range of pressure varying from about 5 atmospheres up to about 50 atmospheres. The preferred range, from the standpoint of optimum ease of operation commensurate with high yields, lies in the range of from about 20 to about 30 atmospheres.

The temperature at which the oxidation is conducted depends upon the pressure employed, and, in general, may vary from about 60° C. up to about 300° C. When atmospheric pressures are employed, the preferred temperature range lies between about 80° C. and about 180° C., the optimum temperature lying between about 120° C. and about 160° C. Normally, when operating at atmospheric pressure, the reaction mixture is maintained at its boiling point. When superatmospheric pressures are employed, the operating temperatures are, desirably, correspondingly higher. For example, when operating within the higher pressure permissible, temperatures of up to about 200° C. may be found desirable. In general, however, when operating within the preferred range of from about 20 to about 30 atmospheres pressure, it has been found desirable to maintain the reaction temperature within the range of from about 150° C. to about 175° C.

Operating at atmospheric pressure, it has been found that excellent yields of terephthalic acid can be realized at temperatures below about 150° C. and down to about 80° C., at which temperatures and pressure p-xylene and p-toluic acid have heretofore appeared to be highly refractory with respect to catalytic oxidation with molecular oxygen to terephthalic acid. The availability of these lower temperatures for the oxidation process is of particular advantage in that these lower temperatures permit the use of highly active catalysts, such as soluble salts of cobalt, manganese and barium, without excessive oxidation of the p-diisopropyl benzene and without a more or less severe attack upon the solvent that may occur when these catalysts are used at higher temperatures.

As the molecular-oxygen containing gas, there can be employed air, oxygen-enriched air, "industrial oxygen" having an oxygen content of from about 80 to 90% by volume, or even pure oxygen. Oxidation of p-diisopropyl benzene to produce as the only products terephthalic acid, carbon dioxide and water theoretically would require 9 moles of oxygen per mole of p-diisopropyl benzene. In actual practice it will be found that in most instances only about 5 to 8 moles of oxygen per mole of p-diisopropyl benzene oxidized are consumed. Oxidation of the methyl group split off apparently does not proceed to such an extent that carbon dioxide and water are the sole oxidation products. Analysis of the gaseous oxidation products shows that carbon monoxide, formic acid and formaldehyde also are formed.

The rate at which the oxygen-containing gas is introduced is governed by the maximum absorption rate.

Practically complete absorption occurs as long as not more than a certain maximum quantity of oxygen is introduced, provided that the reaction mixture is thoroughly stirred. If an amount of oxygen greater than this maximum is introduced, the absorption is not increased thereby, irrespective of any stirring or agitation, and the only result is that the excess oxygen passes through the reaction mixture unconsumed, which is, of course, uneconomical and undesirable. In practice, the rate at which the oxygen-containing gas is introduced into the reaction zone can be so adjusted that only a small proportion of oxygen, preferably not more than about 10% by weight, is not absorbed by the reaction mixture. Careful control of the flow rate can reduce the amount of oxygen not absorbed substantially. However, it is desirable that a slight excess, perhaps up to about 5%, be fed to the reaction mixture in order that saturation of the reaction mixture with oxygen is assured.

In carrying out the process of the invention it is necessary that the diisopropyl benzene be dissolved at least partially, and preferably completely, in a suitable organic liquid. The liquid employed must be one in which the diisopropyl benzene to be oxidized is quite soluble. The amount of solvent used should be such as to completely dissolve all of the isomer charged, and a moderate excess—provided that the limits of the critical ratio of the diisopropyl benzene to solvent are adhered to—may be desirable to insure complete solution and also to give a mixture of sufficient volume for efficient handling. While it is highly desirable that the diisopropyl benzene charged should be completely dissolved, it must be noted that the process of the invention is also satisfactorily operable where the diisopropyl benzene charged is only partially dissolved in the solvent, and is gradually further dissolved in the course of the reaction as the hydrocarbon already dissolved oxidizes. It is also desirable that the organic liquid employed be a solvent for any intermediate product that might be formed during the oxidation, but that it not be a solvent for the phthalic acid product, this requirement aiding the desired reaction and also allowing for easy and simple removal of the desired product. It is preferred that the rate of addition of the diisopropyl benzene be such that all of the hydrocarbon added is immediately soluble in the reaction mixture. It is also preferred to adjust the rate of addition of the hydrocarbon or to choose such a compound as solvent that any intermediate reaction products also remain in solution, the desired dicarboxylic acid being the only insoluble material in the reaction mixture. Suitable solvents include, among others, one or more of the following: the halogen-substituted benzenes, such as the chlorobenzenes, benzenoid hydrocarbons devoid of substituents that are subject to attack under the reaction conditions employed, such as benzene, diphenyl and tert-butyl benzene, halogen-substituted alkanes, such as carbon tetrachloride and sym-tetrachloroethane, and carboxylic acids, such as phenylacetic acid or a lower saturated aliphatic carboxylic acid, such as propionic acid. It has been discovered that this latter class of solvents—e. g., the lower aliphatic acids—satisfy these requirements most satisfactorily. Of this class the most desirable acids are the lower saturated fatty acids containing from about 2 to about 8 carbon atoms per molecule. Examples of this group are acetic acid, propionic acid, n- and isobutyric acid, n-valeric acid, trimethylacetic acid, caproic acid, n-heptanoic acid and various isomers of these acids. Of this group the lower members (having no more than 4 carbon atoms per molecule) have been found to be the most desirable, acetic acid, propionic acid, n- and iso-butyric acids being representative of this group. Mixtures of these acids may also be used as the solvent. The reaction system may also contain minor proportions of substances other than the organic acid solvent, provided that these substances are inert in the proportions in which they are present—e. g., they do not adversely affect the process and do not contaminate the product. Examples of these substances include water and various saturated hydrocarbons. It is desirable where the solvent employed is one in which water is immiscible, that the amount of water present in the reaction mixture be as small as can be practicably assured, since the presence of two immiscible liquid phases may interfere with the efficiency of the oxidation.

The process of the invention thus comprises preparing a mixture of p-diisopropyl benzene, solvent and catalyst, passing an oxygen-containing gas through this mixture until the p-diisopropyl benzene is actively oxidizing, and using this highly active mixture as the reaction medium for the oxidation of further added amounts of p-diisopropyl benzene to terephthalic acid. By employing this reaction system the p-diisopropyl benzene subsequently fed to the reaction mixture is converted to terephthalic acid in approximately 60–70% yield. In contrast, as shown in Example II (infra), the oxidation of a single batch of p-diisopropyl benzene, without any addition of fresh p-diisopropyl benzene or catalyst, results in a yield of terephthalic acid of but 35%. This difference in result can only be explained by the particular method used, which method is based primarily on the discovery that a consistently high level of conversion can be obtained only when additional amounts of p-diisopropyl benzene and catalyst are fed to the reaction theater. The weight ratio of catalyst to p-diisopropyl benzene in subsequent additions of catalyst and p-diisopropyl benzene must be such as to nullify the catalyst losses that may e. g. occur as a result of removing the precipitated terephthalic acid from the liquid reaction mixture or to compensate possible partial inactivation of the catalyst which has already participated in the reaction, for otherwise the continuous high conversions and yields which are typical of the process of the invention will not be obtained. Therefore, the rate at which the catalyst is fed into the system must be carefully controlled. For example, when starting up the process of the invention, there is charged to the reactor an amount of p-diisopropyl benzene, the solvent and the catalyst. The amount of the catalyst, compared to the amount of p-diisopropyl benzene charged, will be determined in part by the reaction conditions under which the oxidation is to be conducted and in part by the desired rate of conversion of the hydrocarbon to terephthalic acid.

Operating at atmospheric pressure the original quantity of p-diisopropyl benzene is consumed during the first 20 to 25 hours of reaction time, and thereafter further amounts of p-diisopropyl benzene are added, either continuously or intermittently. (While addition of further amounts of p-diisopropyl benzene may be made during the first 25 hours of reaction time, without interfering with the oxidation, such is not necessary to assure the attainment of high conversions and yields.) It has been found that under these conditions the highest conversions and yields of terephthalic acid are obtained when, following this starting procedure, the p-diisopropyl benzene is added at a rate such that a quantity of p-diisopropyl benzene equal to that originally charged is fed into the reaction mixture over a time period of from about 30 to about 60 hours, optimum yields being obtained when this time period is about 45 hours.

Likewise, additional catalyst need not be added during the first 20 to 25 hours of reaction time, although fresh catalyst may be added during this period without interfering with the desired reaction. Following this initial period, however, it has been found essential to the attainment of the desired conversion and yield that further catalyst be added concurrently with the addition of p-diisopropyl benzene. The rate of catalyst addition is such that a quantity of catalyst equal to that originally charged is added to the reaction mixture over a time period of from about 25 to about 55 hours, the optimum time period being about 40 hours.

When the process is carried out under superatmospheric pressures the before-mentioned time periods are considerably reduced.

If the catalyst and p-diisopropyl benzene are fed to the reaction zone intermittently, or continuously in separate flows, and not as a mixture, it will be necessary to add the catalyst in a weight ratio to the p-diisopropyl benzene fed that preferably is approximately one-eighth higher than the weight ratio of catalyst to p-diisopropyl benzene in the original charge. This ratio—⅛—must not be regarded as more than an approximation, ratios somewhat above or below this particular ratio being permissible in specific cases.

While our experience indicates that there are formed during reaction no by-products which inhibit the desired reaction, it may be desirable in some cases to withdraw from the reaction mixture either continuously or intermittently a small fraction of the entire mixture, e. g., between about 0.5% and about 3% per hour, which is either discarded or from which the diisopropyl benzene and/or the solvent is separated in substantially pure form and returned to the reaction mixture. This small off-take of reaction mixture apart from or in addition to the withdrawal of phthalic acid produced by oxidation reaction serves to prevent the accumulation of inhibitory substances which might interfere with the oxidation.

In carrying out the oxidation of p-diisopropyl benzene according to the process of this invention, it has been found desirable that the reaction mixture be maintained in substantially anhydrous state. By the term "substantially anhydrous state" is meant that the weight of water present in the reaction zone amounts to not more than about 2 per cent of the total weight of the reaction mixture and preferably the amount of water should not exceed from about 0.5% to about 1% by weight of the total reaction mixture. The concentration of water in the mixture may be controlled by any method known to the art. For example, the reaction vessel may be equipped with a condenser which passes the refluxing liquid to a separation chamber, and the aqueous phase, if any, removed as formed. Alternatively, the water may be removed from the reaction mixture by the use of dehydrating agent, added directly to the mixture itself. If this latter method is employed, it is preferred that the dehydrating agent be the anhydride of a lower fatty acid. It is preferred that the anhydride employed be the anhydride of the organic acid used as the solvent, so that the removal of the water will not necessitate the introduction of any foreign material into the reaction mixture. Thus, where acetic acid is used as solvent, acetic anhydride may be added to the reaction mixture as necessary to maintain the amount of water in the reaction mixture below the stated maximum limit. Correspondingly, when propionic or butyric acid is used as solvent, the preferred anhydride is propionic anhydride or butyric anhydride, respectively. When an acid anhydride is employed as dehydrating agent, care must be taken to maintain the relative concentration of p-diisopropyl benzene and acid solvent within the prescribed limits, due allowance being given for the amount of acid solvent effectively added when the acid anhydride hydrolyzes with the water present to form additional quantities of the acid. If an organic acid is not the solvent employed, it is preferred that the water formed by the oxidation of the p-diisopropyl benzene be removed in the vapor phase with the gaseous reaction products.

The following examples are shown to illustrate various possible specific embodiments of the invention. It is to be understood that these examples are to be considered as illustrative in nature only, and are in no way intended to restrict the scope of the subject invention. In these examples the term "p. b. w." means parts by weight and the term "p. b. v." means parts by volume, unless otherwise stated. The relation of parts by weight to parts by volume is the same as the relation of the kilogram to the liter.

*Example I*

To a mixture of 40 p. b. w. of para-diisopropyl benzene in 120 p. b. w of propionic acid was added 0.25% by weight of cobalt acetate and 0.5% by weight of manganese acetate (total weight of catalyst added being 0.3 p. b. w.), the weight of the catalyst being based on the weight of para-diisopropyl benzen charged. The reaction was carried out under atmospheric pressure, the temperature being maintained within the range of 130° C. to 135° C. Pure oxygen was passed through the mixture at a rate of 5800 p. b. v. per hour (measured at 20° C. and 1 atm. pressure) the reaction mixture being continuously stirred throughout the entire period of the reaction. After 22 hours addition of para-diisopropyl benzene was begun at an average rate of about 0.6 p. b. w. per hour. At the same time, addition of fresh catalyst was begun and continued throughout the reaction at an average rate of about 0.005 p. b. w. per hour. At the end of 62 hours total reaction time, 0.3 p. b. w. of catalyst (equal to the weight of catalyst originally charged) had been fed to the reactor. At the end of 67 hours 40 p. b. w. of p-diisopropyl benzene (equal to the weight of the hydrocarbon originally charged) had been fed. After 148 hours the total quantity of para-diisopropyl benzene added was 81 p. b. w. and the total weight of catalyst added was 0.68 p. b. w. Before each addition of para-diisopropyl benzene the terephthalic acid formed was removed by filtration. On an average 62 mole per cent of the added para-diisopropyl benzene was converted into terephthalic acid. At the end of the 148-hour run the total yield of terephthalic acid represented 49.6 mole per cent of the total para-diisopropyl benzene charged.

*Example II*

The oxidation demonstrated in Example I was repeated for a period of 22 hours, the concentration of hydrocarbon being maintained within the specified range but without the addition of additional catalyst, or p-diisopropyl benzene. The yield of terephthalic acid was approximately 35% based on the p-diisopropyl benzene charged.

*Example III*

The process described in Example I was repeated, substituting an equal weight of butyric acid for the propionic acid of that example and employing a reaction temperature of 154 to 156° C. The rate of addition of para-diisopropyl benzene and catalyst was similar to that employed in Example I. At the end of 111 hours total reaction time a total quantity of 72 parts by weight para-diisopropyl benzene and 0.60 p. b. w. catalyst had been added. On an average 64 mole percent of the para-diisopropyl benzene added was converted to terephthalic acid. The total yield was 52.4 moles percent based on total amount of p-diisopropyl benzene charged.

*Example IV*

A stainless steel autoclave provided with a stirring mechanism and having a capacity of 2.6 liters was charged with 360 grams of paradiisopropyl benzene, 600 grams acetic acid, 1.08 grams of cobalt acetate and 1.08 grams manganese acetate. While stirring at a rate of 1400 rotations per minute air was passed through the reaction liquid at 165° C. in such a way that gas was carried off from the autoclave at a rate of 350 l./h., the pressure in the autoclave being maintained at about 20 ata. After a reaction period of 6½ hours the autoclave was cooled to room temperature and the pressure was reduced to the atmospheric. The autoclave was opened thereafter, and the precipitated terephthalic acid was removed from the reaction mixture by filtration. The separated terephthalic acid was washed with a minor quantity of acetone, and then the precipitate was dried and weighed. The yield of terephthalic acid was 142 grams, being 38.5 mol. percent taken on the initial quantity of hydrocarbon.

The water content of the filtrate, weighing 600 grams, was 9.1% by weight.

To the filtrate was added 70 grams of p-diisopropyl benzene, 0.5 gram of cobalt acetate, 0.5 gram of manganese acetate, 300 grams of acetic anhydride (sufficient to dehydrate the reaction mixture almost entirely) and such a quantity of acetic acid (about 100 grams) that the total quantity of liquid was nearly 1 liter.

Now this mixture was oxidized, during 5½ hours, under the same conditions of temperature, pressure, stirring and rate of passing air as described above. Then the manipulations following after the first oxidation step were repeated, after which the filtrate of the second oxidation step was treated in the same manner as the filtrate of the first oxidation step, etc. Thus the treatment of the reaction mixture of the second oxidation was followed up by another eleven quite similar steps.

At the end of these steps the average yield of terephthalic acid, calculated on the total amount of p-diisopropyl benzene added to the filtrates, was 67.5 mol. percent.

When the above-mentioned operations were carried out under the same conditions, but without the addition of a dehydrating agent, the average total yield of terephthalic acid only amounted to 20 mol. percent.

We claim as our invention:

1. A process for the production of terephthalic acid, which process comprises passing an oxygen-containing gas through a liquid-phase mixture comprising p-diisopropyl benzene, an organic solvent consisting of a lower saturated aliphatic monocarboxylic acid and an oxidation catalyst comprising a mixture of a cobalt carboxylate and a manganese carboxylate, together with from none to a minor amount of barium carboxylate at a temperature between 60° C. and 300° C., in said mixture of hydrocarbon, solvent and catalyst, the weight ratio of p-diisopropyl benzene to solvent being within the range of from about 10:1 to about 1:15, and the concentration of catalyst being within the range of from about 0.01% to about 5%, this concentration being calculated on the basis of the total weight of metal in the catalyst and the weight of p-diisopropyl benzene charged, adding a further amount of p-diisopropyl benzene, together with a further amount of said catalyst, regulating the addition of p-diisopropyl benzene and of said catalyst so that the rate of oxidation of p-diisopropyl benzene remains at a substantially constant level, and separating terephthalic acid as product.

2. The process of claim 1, in which the organic solvent is propionic acid.

3. The process of claim 1, in which the organic solvent is butyric acid.

4. A process for the production of terephthalic acid, which is characterized by the steps of passing at a pressure of 5 to 50 atmospheres an oxygen-containing gas through a liquid-phase mixture essentially comprising p-diisopropyl benzene, from about 1/10 to about 15 times the weight of said p-diisopropyl benzene of an organic solvent consisting of a lower saturated aliphatic monocarboxylic acid and an oxidation catalyst comprised of a mixture of a cobalt carboxylate and a manganese carboxylate, at a temperature of from about 120° C. to about 180° C., adding additional amounts of p-diisopropyl benzene and catalyst so as to maintain the rate of oxidation of p-diisopropyl benzene at a substantially constant level, whereby there occurs oxidation of said diisopropyl benzene to a phthalic acid, which is subsequently recovered as product.

5. The process of claim 4, in which the organic solvent is acetic acid.

6. The process of claim 4, in which the reaction mixture is at all times maintained in a substantially anhydrous state.

7. In a process for the production of terephthalic acid by the reaction of p-diisopropyl benzene and molecular oxygen in a substantially anhydrous reaction medium comprising a lower saturated aliphatic acid and in the presence of a catalyst comprising a mixture of a cobalt carboxylate and a manganese carboxylate at a temperature between 60° C. and 300° C., the improvement which comprises maintaining the reaction mixture in substantially anhydrous condition by adding to said mixture the anhydride of the acid employed as the reaction medium.

8. A process for the production of terephthalic acid which comprises passing an oxygen-containing gas through a liquid-phase mixture comprising p-diisopropyl benzene, an organic solvent consisting of a lower saturated aliphatic monocarboxylic acid and an oxidation catalyst comprising a mixture of a cobalt carboxylate and a manganese carboxylate together with from none to a minor amount of a barium carboxylate at a temperature between 60° C. and 300° C.

References Cited in the file of this patent

UNITED STATES PATENTS

| | | |
|---|---|---|
| 1,902,550 | Forrest et al. | Mar. 21, 1933 |
| 2,276,774 | Henke et al. | Mar. 17, 1942 |
| 2,302,462 | Palmer et al. | Nov. 17, 1942 |
| 2,479,067 | Gresham | Aug. 16, 1949 |
| 2,578,654 | Hearne et al. | Dec. 18, 1951 |

FOREIGN PATENTS

| | | |
|---|---|---|
| 623,836 | Great Britain | May 24, 1949 |
| 681,455 | Great Britain | Oct. 22, 1952 |
| 1,017,881 | France | Oct. 1, 1952 |